T. J. Mayall,
Belting Machine,
N° 27,001.  Patented Jan. 31, 1860.
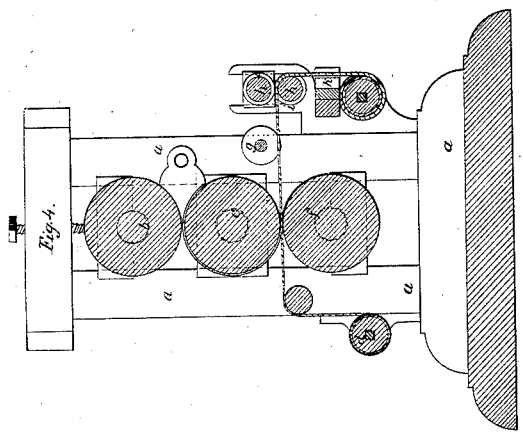
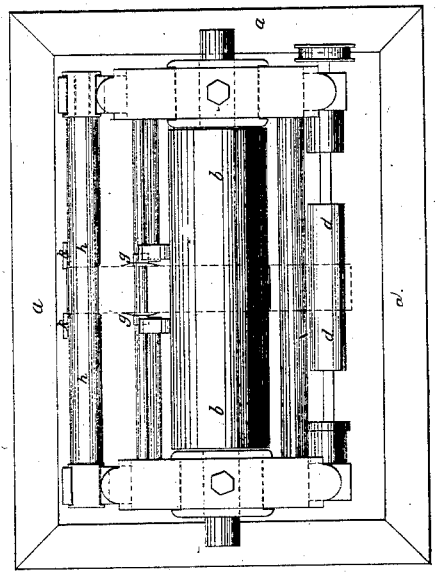
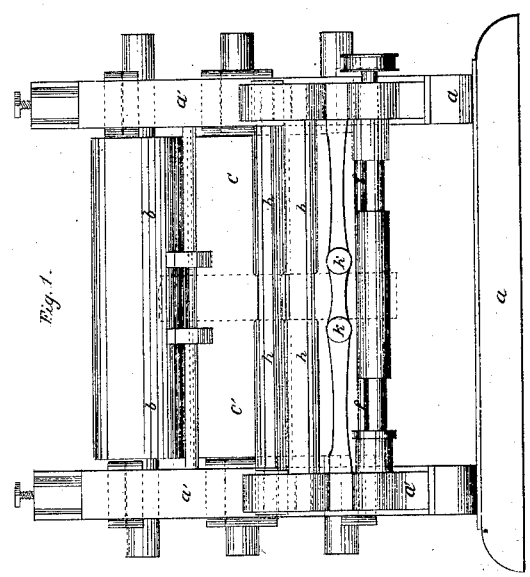
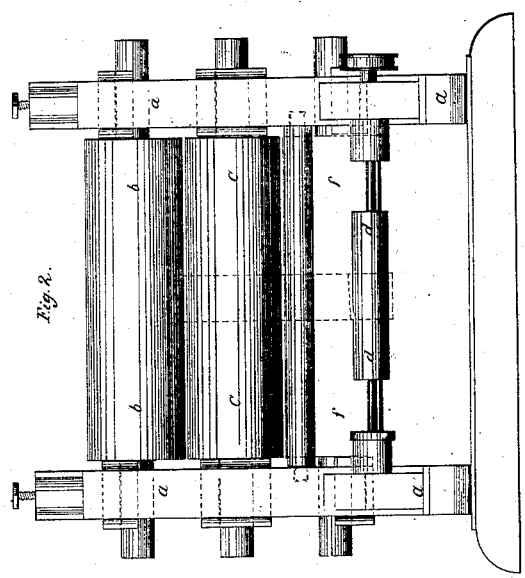
Witnesses
Joseph Gavett
Albert M. Brown
Inventor
Thos. J. Mayall

UNITED STATES PATENT OFFICE.

THOMAS J. MAYALL, OF ROXBURY, MASSACHUSETTS.

MACHINE FOR MAKING RUBBER BELTING.

Specification of Letters Patent No. 27,001, dated January 31, 1860.

*To all whom it may concern:*

Be it known that I, THOMAS J. MAYALL, of Roxbury, in the county of Norfolk and State of Massachusetts, have invented certain new and useful Improvements in the Manufacture of India-Rubber or Gutta-Percha Belting or Banding, and that the following description, taken in connection with the accompanying drawings, hereinafter referred to, forms a full and exact specification of the same, wherein I have set forth the nature and principles of my said improvements by which my invention may be distinguished from all others of a similar class, together with such parts as I claim and desire to have secured to me by Letters Patent.

My invention is more particularly applicable to the formation of a new belting or banding for which I have made application for separate Letters Patent, the said belting or banding consisting of a solid woven fabric without seams coated or covered on one or both sides with india rubber or gutta percha.

The object aimed at and secured by the present invention is to coat the belt and form true and even edges to the belt or band, which, it will be obvious, is a much more difficult operation than in ordinary belting or banding, by machinery.

My new machine is represented in the accompanying drawings, of which—

Figures 1 and 2 are respectively front and rear elevations. Fig. 3 is a plan or top view of the same. Fig. 4 is a central vertical section.

$a\ a\ a$ in the drawings represent the supporting framework of the machine, $b\ b$ and $c\ c$ are large pressure rollers revolving in opposite directions, between which the india rubber or gutta percha in a soft and tolerably thick mass is fed and rolled into a sheet; thence partially around the lower pressure roller $c$ until the sheet comes in contact with a sheet of duck or other woven fabric fed from a supplying roll $d$ and passing between the pressure roll $c$ and a lower roll $f$, whereby the entire surface of the woven fabric has the india rubber or gutta percha ground and driven into it. The superfluous rubber or gutta percha is then cut off by two cutters $g\ g$ susceptible of lateral adjustment so as to be adapted to different widths of belts. The belt or band with its surface thus covered, is then passed between rollers $h\ h$, having portions of their peripheries cut away so as to leave shoulders $i\ i$ with slightly rounded edges. These press the edges of the india rubber or gutta percha firmly and evenly upon the edges of the woven fabric. In lieu of thus cutting away the peripheries of the rollers $h\ h$ it is evident that collars or circular disks of similar form to the shoulders $i\ i$ may be placed upon the rollers $h\ h$ and serve a similar purpose. The edges of the belt or band are then calendered so as to form a smooth and even finish thereto, by being passed between two grooved wheels $k\ k$ which completes the operation, with the exception of the vulcanization which may be done in any proper manner.

The cutters $g\ g$ can be made by stationary or revolving knives. The wheels $k\ k$ are sometimes used before the belt passes through the rollers $h\ h$.

Having thus described my improvements, I shall state my claim as follows:

What I claim as my invention and desire to have secured to me by Letters Patent is—

1. The improvement in the manufacture of machine belting or banding composed of a woven fabric covered on one or both sides with india rubber or gutta percha, which consists in forming the edges thereof by means of a machine, having its essential features substantially as herein described.

2. In belting machines I claim the two revolving cutters arranged upon one and the same shaft to operate substantially in the manner and for the purposes specified in combination with a suitable device for laterally adjusting the said cutters, so as to be adapted to the cutting off or removing of superfluous gum at the edges of belts of different widths.

3. I claim the rollers $h\ h$ or their equivalents acting as dies to form the belt and finish the edges thereof.

THOS. J. MAYALL.

Witnesses:
JOSEPH GAVETT,
ALBERT W. BROWN.